Figure 1:
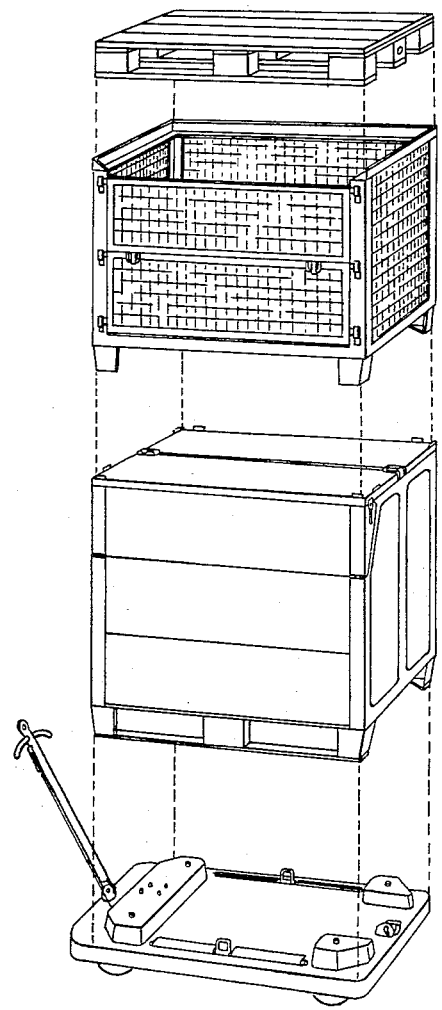

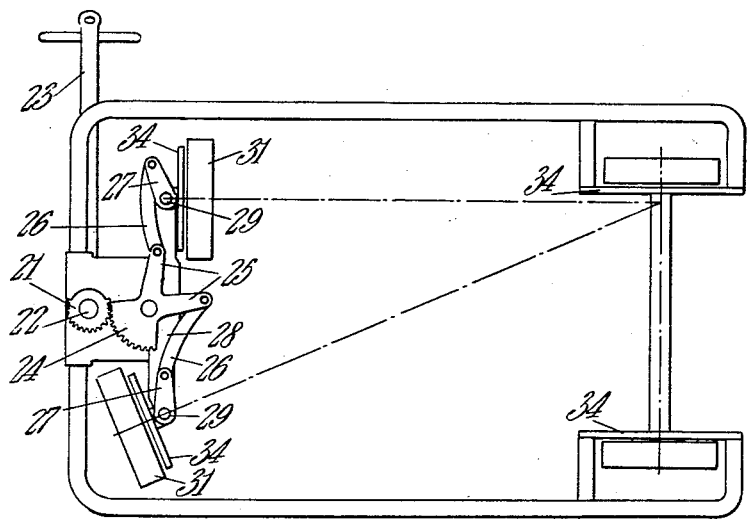
Fig. 9.
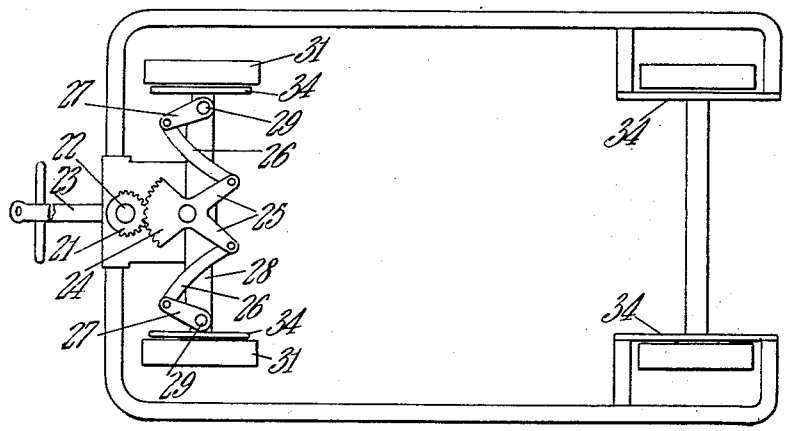

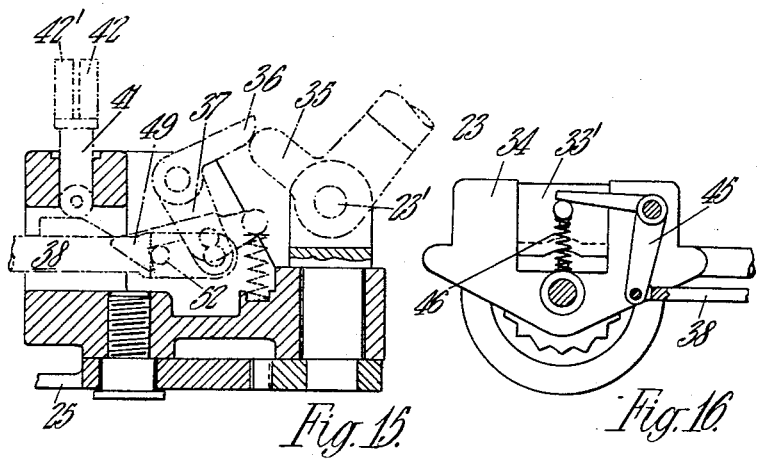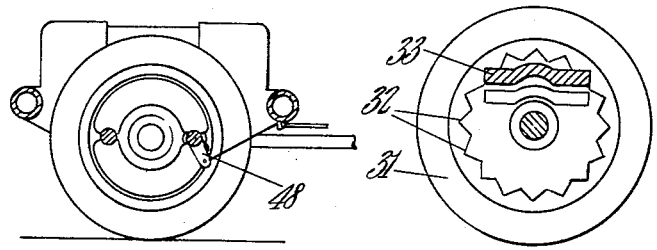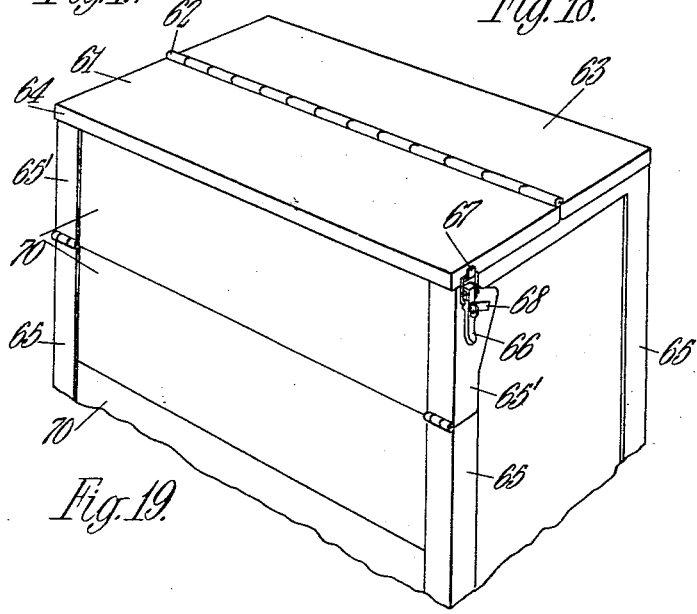

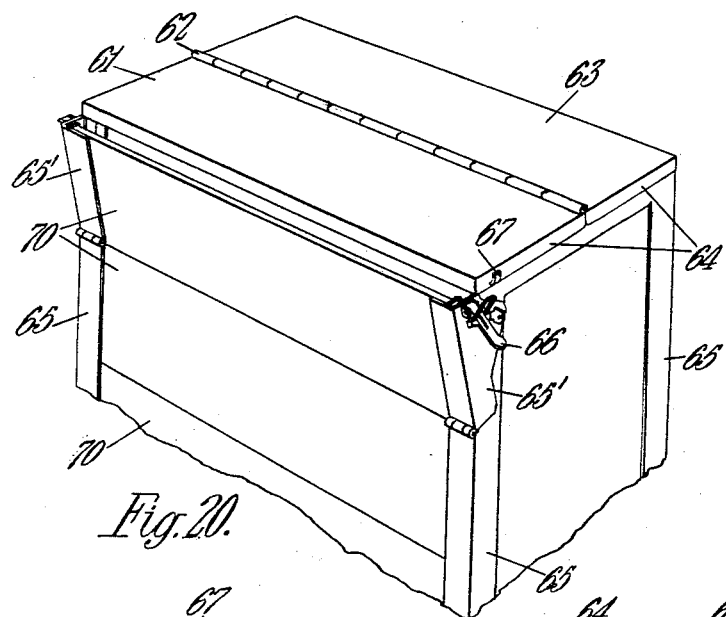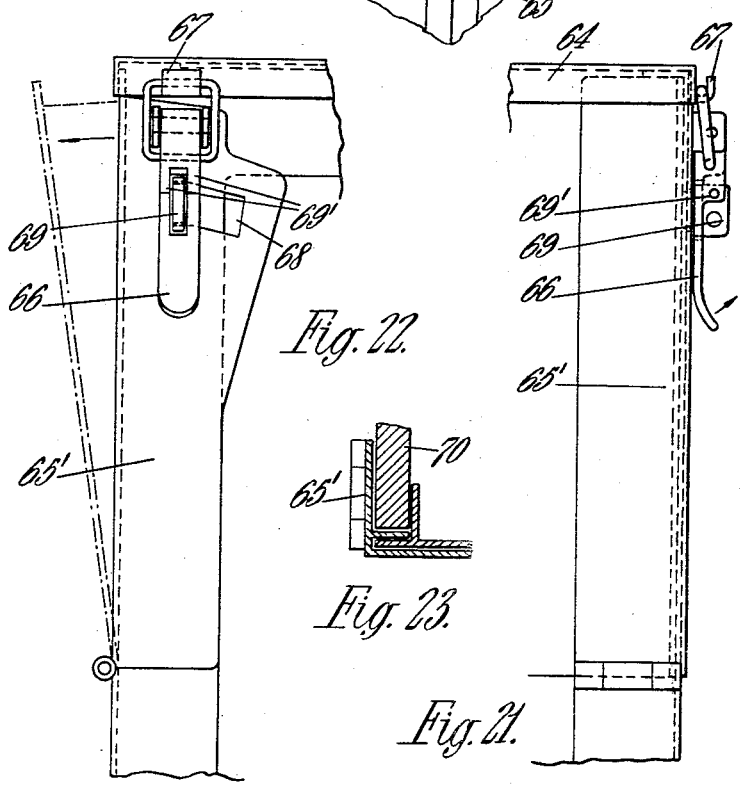

United States Patent Office 3,154,316
Patented Oct. 27, 1964

3,154,316
TRANSPORT CONTAINERS
Karl Göhmann, Haarstrasse 6, Hannover, Germany
Filed May 31, 1961, Ser. No. 113,909
Claims priority, application Germany May 30, 1960
3 Claims. (Cl. 280—103)

In forwarding goods, particularly in the case of rail traffic small portable containers with a volumetric capacity up to about three cubic metres are frequently used. These include iron-bound wooden chests, on which running wheels are permanently mounted. These chests have angled irons on the edges. The lid of the chest is longitudinally divided in the middle. The front portion of the lid is hinged to the rear portion for rocking upwards, or else is hinged to a reinforcing rib extending parallel to the hinge. The angle iron on the front edge of the lid engages over the front wall of the chest when the lid is closed and can be held fast with a toggle-lever fastening mounted towards the front on each side wall. This fastening is secured against unauthorised opening by means of a lock and a leaden seal.

The transversely extending boards of the front wall of the container are removably inserted. The front wall of the transport container can therefore be removed for the loading and unloading of the container as soon as the lid is opened. The lid however can only be opened when the transport container is standing independently, that is when no load is placed on top of the container to be opened. This renders it difficult to load and unload such containers in warehouses.

On the other hand, the fixed under carriage or bogie on these transport containers involves a considerable loss of available vertical space in wagons, on motor lorries or in the warehouse.

This invention relates to transport containers with removable under-carriages or running mechanism for forwarding goods which can be locked to the container mounted thereon, and in which the front wall of the transport container, or at least a part including the upper transverse board, is so arranged as to be rockable forwards. According to the invention the locking device is so constructed that the container, when mounted upon the running mechanism, is automatically locked to the latter, and on the other hand the locking bars, when unlocking takes place, are at the same time unlocked but are brought back into the locked position, as soon as the container is lifted off the under carriage by the operation of removing the container is however raised so far above the under-carriage that when the locking bolts are thrown back it is no longer held fast by them.

For this purpose there are arranged, on the under part of the container and on the running mechanism, the elements of a combination which consists of a trip-switch simultaneously controlling the locking bars, and a re-setter engaging in the trip-switch this re-setter automatically bringing the opened locking bars back into the locking position after the container has been lifted off the vehicle.

This locking device according to the invention couples the container automatically to the under-carriage as soon as the container is placed upon it.

The coupling device may comprise for instance two stirrup-shaped locking bars arranged on opposite sides of the under-carriage or in the middle, which, when the container is placed on the under-carriage automatically engage over the backs of wedges arranged on the feet of the container, and thereby couple the container to the under-carriage and lock them together. This locking mechanism has to be opened by means of switch-flaps which are actuated either by means of lifting shoes on a forked stacker which are inserted between the container and the running mechanism, or by pressing down the switch-flaps with the foot, if the container is being lifted off its under-carriage with a crane. The locking bars on the under-carriage automatically move back into the locking position when the container has been lifted off the under-carriage. A safety device is provided which prevents accidental actuation of the switch-flaps, which might bring the locking bar out of its locking position into the unlocking position.

The invention furthermore concerns a device for blocking the running wheels of the undercarriage. The running wheels of these transport containers must be blocked for the sake of precaution, so as to preclude any possibility of undesired movement of the portable container, when being loaded and unloaded, or during transport in the goods wagon, and so as to guard the container against slipping. This device for blocking the running wheels is controlled by means of the centre pole. It furthermore retains the centre pole in its raised position.

For blocking purposes, each running wheel is provided on its side facing the truck body with internal teeth, and with each wheel is associated a segment, which, when the centre pole is in its raised position, comes into engagement, by its two end surfaces, with the opposite tooth flanks of the internal wheel teeth. The segment is displaceable like a slide-block in bearing plates, which are secured to the axle journal upon which the associated running wheel is mounted. It is engaged in the blocking position by spring force. It is unblocked by rocking the centre pole down into the travelling position.

The front wheels are steered with the centre pole. They are mounted upon horizontally swivelling stub-axles or axle journals. Each axle journal is secured to a vertically journalled shaft. The two vertical shafts are connected with one another by controlling members. These control the front wheels, which are parallel to one another when travelling straight forwards, in such a manner that the axis of that wheel which is adjacent to the centre pole when turning is directed towards the rear wheel located behind it when the centre pole has turned through a right angle, and the axle journal of the other front wheel is likewise directed towards this rear wheel.

Figure 2:
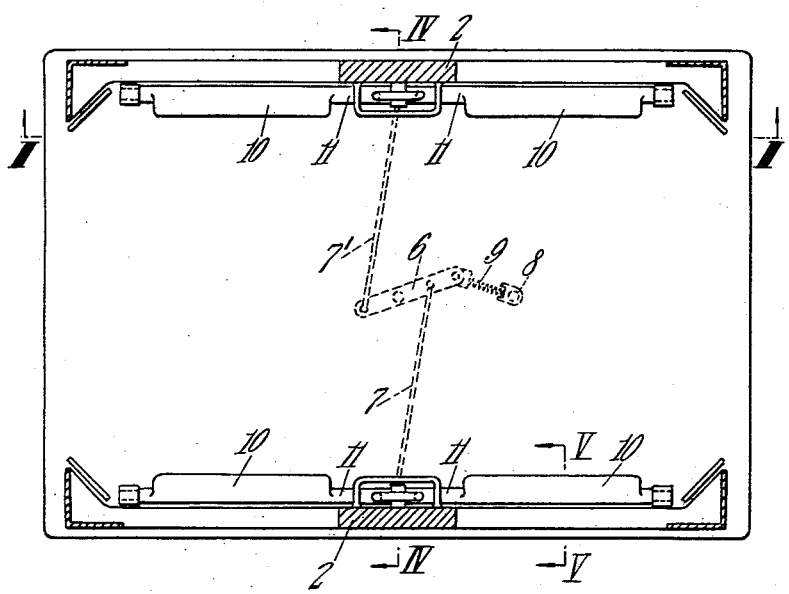
Figure 3:
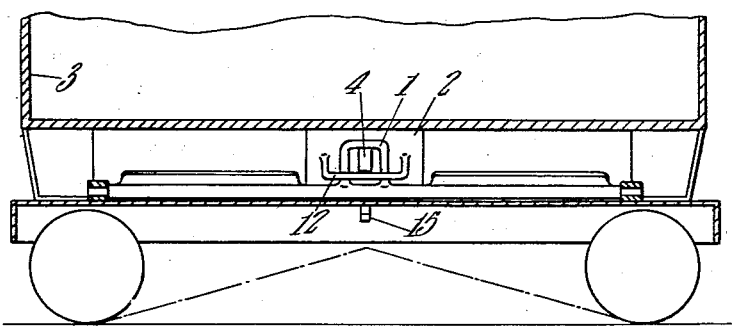
Figure 4:
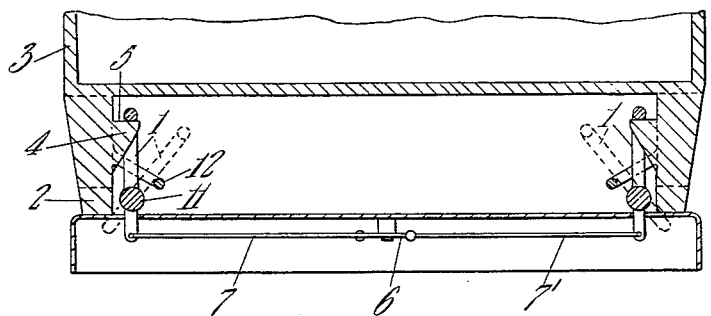
Figure 5:
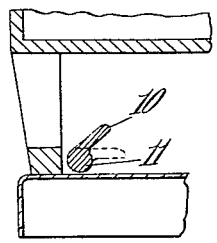
Figure 6:
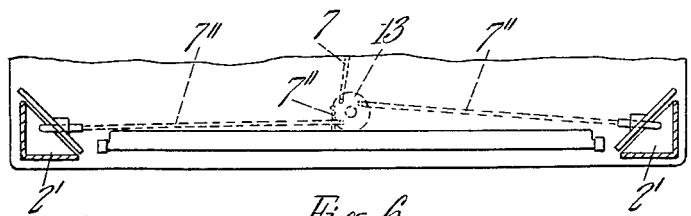

The invention is illustrated by way of example in the accompanying drawings, in which:

FIGURE 1 shows in perspective various transport containers, namely a flat pallet, a freight-box pallet, and a chest provided with a raisable lid, above an under-carriage or truck to which any one of these containers can be locked so as to form a unit;

FIGURE 2, a plan view of the under-carriage;

FIGURE 3 a side view of the under-carriage with the under part of a container mounted thereon in section looking in the direction of the arrows III—III in FIGURE 2;

FIGURE 4 a cross section of the parts shown in FIGURES 2 and 3, as seen in the direction of the arrows IV—IV in FIGURE 2;

FIGURE 5, a partial sectional view, as seen in the direction of the arrows V—V in FIGURE 2;

FIGURE 6, a plan view of a portion of an under-carriage, with a modification of the locking device shown in FIGURE 2.

Figure 7:
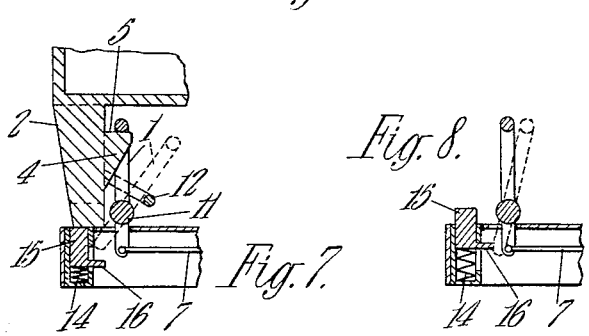
Figure 8:
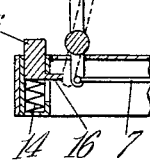
Figure 11:
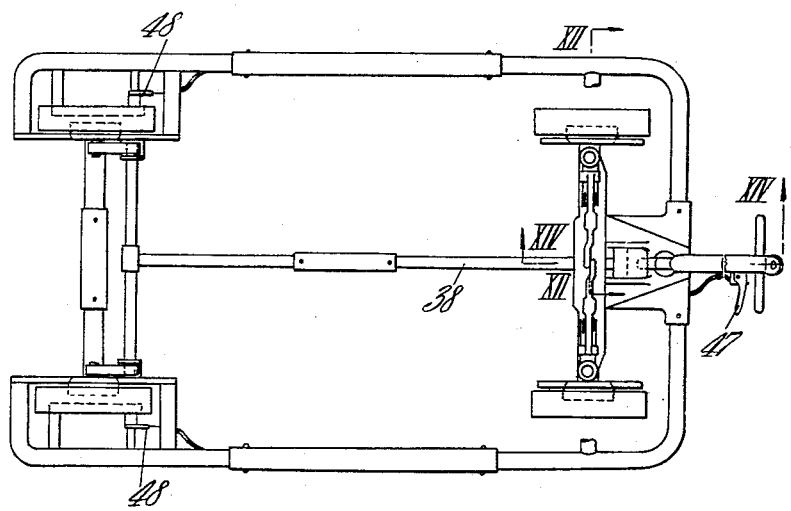
Figure 12:
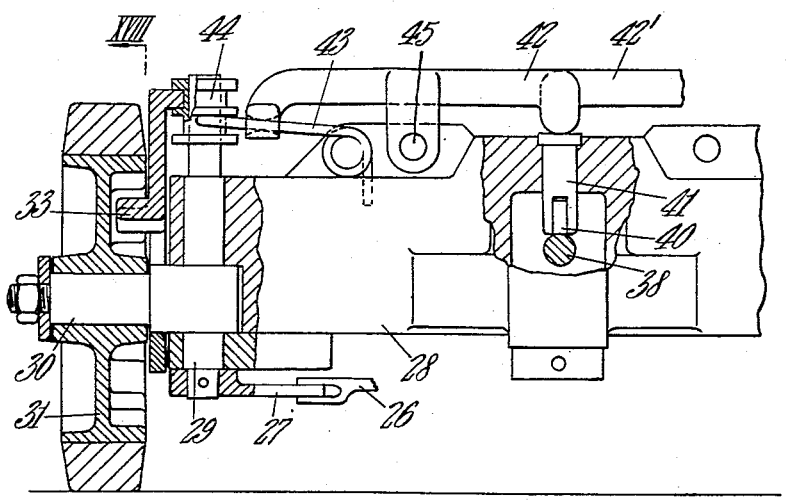
Figure 13:
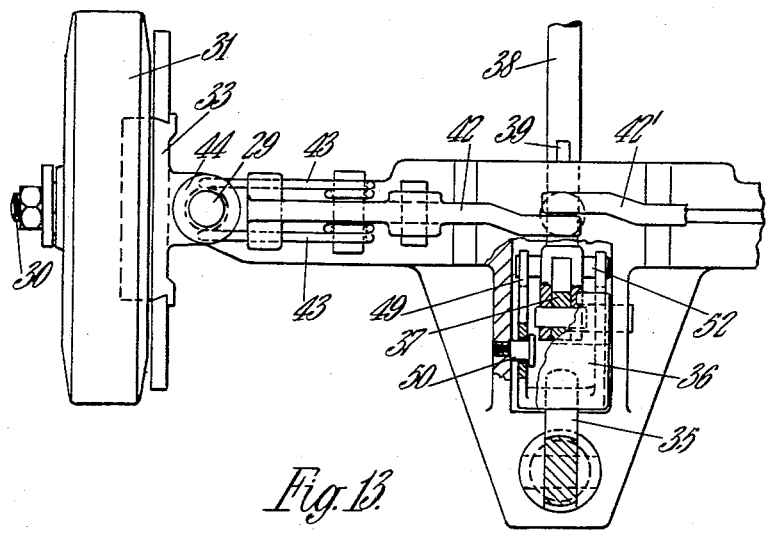
Figure 14:
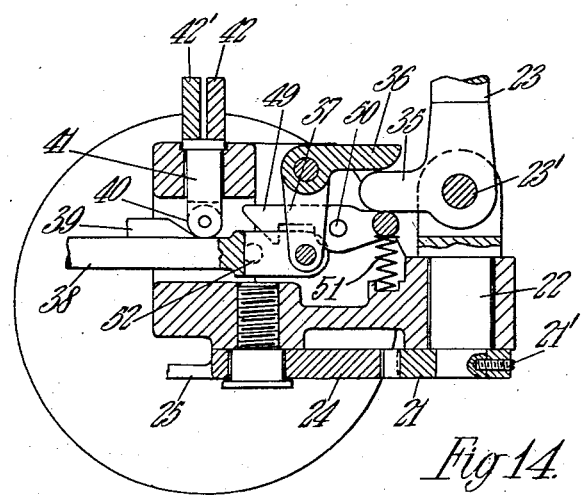

FIGURE 7, a portion of FIGURE 4, illustrating a safety device, which is released by the container being mounted upon the under-carriage;

FIGURE 8, a view similar to FIGURE 7, showing the position of the parts when the container is not mounted upon the under-carriage;

FIGURE 9, a view of the under-carriage from below, with the centre pole swung round through a right angle;

FIGURE 10, a view similar to FIGURE 9, with the centre pole swivelled into the straight-ahead travelling position;

FIGURE 11, a plan of the under-carriage;

FIGURE 12, a view, partly in section, on the line XII—XII in FIGURE 11;

FIGURE 13, a plan view corresponding to FIGURE 12;

FIGURE 14, a view on the line XIV—XIV in FIGURE 11, with the centre pole rocked upwards;

FIGURE 15, a view similar to FIGURE 14, with the centre pole in the travelling position;

FIGURE 16, a view of a rear wheel;

FIGURE 17, a view of the manual braking means on a rear wheel;

FIGURE 18, a view on the line XVIII—XVIII in FIGURE 12;

FIGURE 19, a perspective view obliquely from the front, of the closed upper part of the container;

FIGURE 20, a view similar to FIGURE 19, with part of the front wall rocked outwards;

FIGURE 21, a front view of the edge of the container on the right-hand side;

FIGURE 22, a side view of the toggle lever closure of FIGURE 21; and

FIGURE 23, a section through the edge-armouring, with the removable board of the front wall.

The coupling device that couples and locks the container to the under-carriage when it is placed thereon is provided in part on the under-carriage and in part on the under portion of the container. The part of the coupling device fitted to the under-carriage, in the constructional example illustrated in FIGURES 1 to 8 of the drawings, comprises two stirrup-shaped locking bars 1, arranged on opposite sides of the under-carriage, and connected with one another by a trip-switch system. The other part of the coupling device, fitted to the under portion of the container, consists of a wedge 4, fitted for instance to the middle foot 2 of the under part 3 of the container, with the back or bridge 5 of the wedge arranged at right angles to the inner wall surface of the foot. In the locking position the locking bar 1 engages, as shown by FIGURES 2 to 4, over the bridge 5 of the wedge.

The trip-switch system connecting the two locking bars 1 with one another holds the two locking bars either in the locking position, shown in full lines in FIGURES 4 and 7 or in the unlocked position, shown in broken lines, in these figures. The system comprises a two-armed lever 6, control rods 7 and 7' pivotally mounted thereon, and a compression spring 9, which can swivel about a point 8, and is attached to one end of the lever 6. The control rods 7 and 7' are attached to the locking bars 1, and hold them either in the locking position or in the unlocked position.

The length of the bridge surface 5, or in other words the height or thickness of the wedge, is so dimensioned that the upright locking bar 1, standing in the locking position, cannot pass beyond the tripping position of the trip-switch system when the locking bar, upon the container being placed upon the under-carriage, comes out of its erect position into an inclined position owing to the inclined surface of the wedge 4. The locking therefore takes place positively, because the spring 9, acting upon the trip-switch system, brings the locking bars 1 back into the locking position before the trip switch passes beyond the tripping point.

The container mounted upon the under-carriage can only be lifted off the truck when the locking bars 1 are unlocked. For this purpose, one of a number of inclined switching flaps 10, which are mounted fast upon the shaft 11 to which the locking bar is secured is pressed down. Upon the depression of one of the switching flaps, the others are positively actuated with it. When this unlocking takes place the locking bar 1 approaches a re-setting member 12 mounted fast on the foot 2. This re-setting member 12 brings the locking bar 1, which is in the unlocked position, positively into the upright locking position when the container is taken off the under-carriage. Then, however, the locking bar 1 can no longer pass on to the wedge bridge 5, because the latter, upon the container being lifted has become higher than the locking bar 1.

The control rod 7 may be attached to a rotatably supported disc 13 if it is desired to effect the locking by means of the rods 7'' also at other positions of the container. Here for example the corner feet 2' of the container are provided with apertures which accommodate the ends of the rods 7'' when the latter come into the locking position.

Furthermore the under-carriage is also provided with a safety device which for ensuring that the locking bar 1, when the under-carriage is unoccupied, since it is then freely accessible, is not brought accidentally and unintentionally out of its vertical locking position into the unlocking position. For this purpose a safety bolt 15, subject to the pressure of a spring 14, is provided with an abutment 16, facing the rockable locking bar 1. The abutment 16 points in the direction of the lower arm of a lever which is mounted on the rockable locking bar 1, and serves as a catch, which holds the locking bar in its locking position. The abutment 16 is secured to the safety bolt 15 at such a height that it is only when the bolt is depressed that it cannot hinder the movement of the locking bar 1 into the unlocked position, as FIGURE 7 shows. The locking bar therefore admits of being brought out of its locking position into the unlocking position only when the abutment 16, with the safety bolt 15, is depressed so far that it sets free the lower lever arm of the locking bar 1.

The switching flap 10, therefore, when the container is locked to the under-carriage and the container foot has depressed the safety bolt 15, can be depressed either with the foot, if the container is being lifted with a crane, or with the lifting shoes of a forked stacker inserted between the under-carriage and the transport container, and in this way the trip-switch system can be actuated. The under-carriage is thereby unlocked from the container, and the container can be removed from the under-carriage.

The safety bolt 15 is preferably fitted to the under-carriage at a position where a foot of the transport container comes to stand when the container is put on the under-carriage. Upon the removal of the transport container from the under-carriage the locking bar is brought positively into the locking position by the re-setting member 12, as previously stated, so that it therefore always stands ready in the locking position for another container to be placed on the under-carriage.

The abutment 16 standing at the level of the rod 7, so long as the safety bolt 15 is not depressed, then prevents the locking bar 1 being accidentally pushed out of the vertical locking position. The abutment 16 does indeed permit a small amount of play of the trip switch, with its locking bar 1, when the container is placed upon the under-carriage, in order that the locking bar 1, which then slides along on the surface 5 of the wedge 4, may be able to fulfill its locking function. The abutment 16 however prevents the locking bar 1 unintentionally overstepping the tripping point of the trip-switch system and being thereby unlocked.

Now as regards the device illustrated in FIGURES 9 to 18 for blocking the running wheels. A front toothed wheel 21 is mounted fast, by a pin 21' (FIGURE 14) upon a swivel shaft 22, to which the centre pole or thill 23 is linked by means of a bolt 23'. The toothed wheel 21 meshes with a toothed segment 24 behind it, on which arms 25 are mounted. Each of these arms 25 is connected by way of a rocker 26 with a guide-lever 27, which controls a shaft 29, journalled at the end of an axle 28, with the axle journal 30 secured thereto. Upon the axle journal 30 is mounted the road wheel or running wheel 31. The pitch circles of the teeth of the toothed wheel 21 and of the toothed segment 24 are in the ratio of 1:2. The control 24 to 27 of the front axle journal 30 is so constructed, as FIGURE 9 shows that when the centre pole 23 is turned at right angles, the axes of the two axle journals when produced intersect on the axis of the rear wheels.

Each running wheel 31, on its side facing the under-carriage, is provided with internal teeth 32 (FIGURE 18) of which the tooth flanks facing the end faces of a segment 33 or 33' are to be brought into engagement with these end faces. The segment 33 of each front wheel, or the segment 33' of each rear wheel is displaceable like a slide-block in bearing plates 34, and is to be controlled, from the centre pole 23, by way of a tension rod 38 and a bell-crank lever 36, 37, the segments 33 of the front wheels being actuated from the tension rod 38 as hereinafter explained by way of members 39 to 44, and the segments 33' of the rear wheels by way of members 45 and 46.

With the downward rocking of the centre pole 23 out of the position shown in FIGURE 14 into the travelling position of FIGURE 15, a cam 35 mounted on the foot of the centre pole raises one arm 36 of the bell-crank lever, the other arm 37 of which is attached to the tension rod 38, whereby the segments 33 engageable with the teeth of the front wheels are to be controlled by way of a ramp 39 and members 40 to 44, whilst the segments 33' engageable with the teeth of the rear wheels are to be controlled by way of the members 45 and 46. The ramp 39 mounted on the tension rod 38, when the tension rod is drawn forward, raises a roller 40, and also a bolt 41 secured thereto, as soon as the centre pole 23 is rocked down. Upon the bolt 41 rest the ends of two double-armed levers 42 and 42', which are pressed on to the bolt 41 by the pressure of springs 43. The springs 43 co-operate with a control bush 44, which is slidable upon the shaft 29, and in which the segment 33 engages.

The springs 43 acting upon the segment 33, or the springs 46 acting upon the segment 33' hold the segment 33 or 33' in the blocking position, and provide for the segment to engage in the teeth. By means of the control bush 44 mounted upon the shaft 29, the front wheels can be blocked in any steering position. The tension rod 38 is attached by its rear end to a bell-crank lever 45, which controls the rear-wheel segment 33' subjected to the pressure of the spring 46. When the tension rod 38 is moved forward or rearward, as hereinbefore described, to release or engage the segments 33 with the front wheel teeth 32, the segments 33' will also be released from or engaged with the teeth 32 of the rear wheels. A handle 47 fitted to the centre pole serves for actuating a hand-brake 48 when traversing a slope.

If the centre pole 23 is rocked out of its raised position according to FIGURE 14, in which the running wheels are blocked, into the travelling position according to FIGURE 15, the bell-crank lever 36, 37 brings the rod 38 forward. All four of the segments 33 and 33' are thereby unblocked by way of the members 39 to 44 or 45 and 46, against the pressure of the spring 43 and 46. In this operation a holding claw 49, which is rockable about a bolt 50, and is subject to the pressure of a spring 51, engages over a crossbar 52, which is mounted on the end of the tension rod 38. Thus it holds all the segments in their unblocked travelling position. The centre pole 23, raised as in FIGURE 14, is held fast against risk of accident in its upright position of rest. For the cam 35, fitted at right angles to the foot of the centre pole 23, can only be seated when the centre pole is raised, between the two members 36 and 49 which are subject to spring pressure.

With the transport container according to the invention illustrated in FIGURES 19 to 23, a forwardly rockable front wall or a forwardly rockable member which includes the upper transverse board of the front wall, can be rocked outwards after lifting the front half of the lid. The lid can then be closed again, and a load may be placed upon it. Owing to this outwardly rocked front wall, or the outwardly rocked part of the front wall, the front wall can now be opened without it being necessary to remove the load placed upon the container.

In this case the front portion 61 of the lid is attached to the rear portion 63 thereof by a hinge 62. The edge armouring of the lid is denoted by 64, and that of the under portion of the container by 65. The armouring of the front wall of the container is rockable with the pieces 65'. Upon each of these rockable pieces 65' mounted the toggle-lever closure 66, which engages in the shackle 67 on the front portion of the lid. The slot 68 in the side flange of the armouring angle 65' serves for limiting the angle of upward rocking. The hole 69 in the projecting lug serves for the insertion of the padlock, the hole 69' located above it for the passage of the seal wire. The removable board of the front wall is denoted by 70.

I claim:

1. Apparatus of the type in which transport containers are carried by an under-carriage, comprising: front and rear running wheels, means for blocking the running wheels, these blocking means including internal teeth on each wheel on its side adjacent to the under-carriage, segment means movable into and out of engagement with the teeth on each wheel, actuating members for the segment means, a center pole operably associated with the under-carriage and mounted for swinging up and down between a vertical position and a horizontal position, a cam on the center pole, a bell-crank lever swingably mounted on the under-carriage, with one arm of the bell-crank lever bearing against the cam, a tension rod connected with the other arm of the bell-crank lever, cam means on the tension rod, and a bolt slidably mounted in the under-carriage, and adapted, when engaged by the cam means upon forward movement of the tension rod resulting from movement of the center pole towards its horizontal position, to move the actuating members in such a way as to disengage the segment means from the teeth of the front running wheels.

2. Apparatus of the type in which transport containers are carried by an under-carriage, comprising: front and rear running wheels, means for blocking the running wheels, these blocking means including internal teeth on each wheel on its side adjacent to the under-carriage, segment means movable into and out of engagement with the teeth on each wheel, actuating members for the segment means, a center pole operably associated with the under-carriage and mounted for swinging up and down to a vertical position and to a horizontal position, a cam on the center pole, a bell-crank lever swingably mounted on the under-carriage, with one arm of the bell-crank lever bearing against the cam, a tension rod connected with the other arm of the bell-crank lever, an axle for the under-carriage, a vertical shaft rotatably supported at each end of the axle, an axle journal for each running wheel secured upon the vertical shaft, and a control member slidably mounted upon the said vertical shaft, and so connected with the actuating member for the segment means as to move the said segment means into and out of engagement with the teeth on the front wheels as it slides up and down.

3. Apparatus as claimed in claim 2, further comprising: a short vertical swivel shaft journaled low down in the front of the under-carriage, the center pole being pivotally mounted at the top of this swivel shaft for its rocking movements up and down, a toothed wheel mounted fast on the swivel shaft at its lower end, a toothed segment meshing with this toothed wheel, two arms extending rearwardly from the toothed segment, a rocker connected pivotally with each of these arms, and a guide-lever connected with each of these rockers, each of these guide-levers being connected fast with one of the vertical shafts rotatably supported at the ends of the axle, and the said toothed wheel, toothed segment, arms, rockers and guide-levers being so proportioned that when the center pole, and therefore the said toothed wheel, is turned horizontally through ninety degrees, the axes of the two front axle journals will intersect on the axis of the rear wheels.

References Cited in the file of this patent

UNITED STATES PATENTS

| | | | |
|---|---|---|---|
| 300,884 | Miles | June 24, 1884 |
| 595,251 | Parker | May 24, 1910 |
| 1,046,354 | Weeks | Dec. 3, 1912 |
| 1,203,876 | Hornor | Nov. 17, 1916 |
| 1,340,743 | Tucker | May 18, 1920 |
| 1,604,482 | Reid | Oct. 26, 1926 |
| 2,253,791 | Kline | Aug. 26, 1941 |
| 2,257,618 | Petersen | Sept. 30, 1941 |
| 2,389,574 | Hulquist | Nov. 20, 1945 |
| 2,693,253 | Meyer | Nov. 2, 1954 |
| 3,005,640 | Cole | Oct. 24, 1961 |